United States Patent
Gao (10) Patent No.: US 11,665,631 B2
(45) Date of Patent: May 30, 2023

(54) METHOD FOR DISPLAYING NETWORK IDENTIFIER INFORMATION, MOBILE TERMINAL AND STORAGE MEDIUM

(71) Applicant: BEIJING XIAOMI MOBILE SOFTWARE CO., LTD., Beijing (CN)

(72) Inventor: Yi Gao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 17 days.

(21) Appl. No.: 17/443,640

(22) Filed: Jul. 27, 2021

(65) Prior Publication Data

US 2022/0272617 A1   Aug. 25, 2022

(30) Foreign Application Priority Data

Feb. 20, 2021   (CN) .......................... 202110193212.6

(51) Int. Cl.
  *H04W 48/18*   (2009.01)
  *H04W 48/16*   (2009.01)
  *H04W 88/06*   (2009.01)

(52) U.S. Cl.
  CPC ........... *H04W 48/16* (2013.01); *H04W 48/18* (2013.01); *H04W 88/06* (2013.01)

(58) Field of Classification Search
  CPC ..... H04W 48/16; H04W 48/18; H04W 88/06; H04W 76/27; Y02D 30/70
  See application file for complete search history.

(56) References Cited

U.S. PATENT DOCUMENTS

| | | | |
|---|---|---|---|
| 10,728,840 B2* | 7/2020 | Edwards | H04W 12/06 |
| 2010/0279620 A1* | 11/2010 | Paas | H04M 1/724 |
| | | | 455/566 |
| 2018/0368016 A1* | 12/2018 | Lee | H04W 76/15 |
| 2019/0069229 A1 | 2/2019 | Lee et al. | |

OTHER PUBLICATIONS

European Patent Application No. 21188254.3, Search and Opinion dated Jan. 19, 2022, 16 pages.
NEC "AS support for 5G indication" 3GPP Draft, R2-1708228_5G TSG-RAN WG2 #99, Aug. 2017; 4 pages.
Qualcomm Incorporated et al. "Consideration on the GSMA NR indication requirements" 3GPP Draft, R2-1803664; Feb. 2018, 3 pages.

* cited by examiner

*Primary Examiner* — Julio R Perez
(74) *Attorney, Agent, or Firm* — Cozen O'Connor (57) ABSTRACT

A method for displaying network identifier information includes: when the mobile terminal is located in a first network cell and the mobile terminal is in an idle state, determining received radio resource configuration information and network information of the first network cell, the radio resource configuration information indicating whether access to a second network is supported, and the network information indicating whether the first network cell has an ability to access the second network; determining a network type based on the radio resource configuration information and the network information, the network type comprising a first network and the second network; and displaying network identifier information corresponding to the network type.

17 Claims, 2 Drawing Sheets

METHOD FOR DISPLAYING NETWORK IDENTIFIER INFORMATION, MOBILE TERMINAL AND STORAGE MEDIUM

CROSS-REFERENCE TO RELATED APPLICATION

This application claims the benefits of priority to Chinese Application No. 202110193212.6, filed on Feb. 20, 2021, the contents of which are incorporated herein by reference in their entirety.

TECHNICAL FIELD

The disclosure relates to the field of mobile terminal data processing technologies, in particular, relates to a method for displaying network identifier information, a mobile terminal and a readable storage medium.

BACKGROUND

The fourth Generation Mobile Communication (4G) network and the fifth Generation Mobile Communication (5G) network are widely used.

Networking modes of 5G network include Non-Stand Alone (NSA) and Stand Alone (SA) networking modes. NSA networking uses existing 4G infrastructures (including 4G base stations and 4G core networks) to deploy the 5G network. New 5G base stations and 5G core networks are used in the SA networking, without the need of using 4G infrastructures.

In the NSA networking mode, different operators have different configurations for the 5G network, and the configuration of the same operating terminal for different cells may also be different.

SUMMARY

Embodiments of the disclosure provide a method for displaying network identifier information, applied to a mobile terminal. The method includes: when the mobile terminal is located in a first network cell and the mobile terminal is in an idle state, determining received radio resource configuration information and network information of the first network cell, the radio resource configuration information indicating whether access to a second network is supported, and the network information indicating whether the first network cell has an ability to access the second network; determining a network type based on the radio resource configuration information and the network information, the network type comprising a first network and the second network; and displaying network identifier information corresponding to the network type.

Embodiments of the disclosure provide a mobile terminal. The mobile terminal includes: a processor and a memory for storing instructions executable by the processor. The processor is configured to execute the instructions stored in the memory to implement the above method for displaying network identifier information.

Embodiments of the disclosure provide a computer-readable storage medium having computer program instructions stored thereon, when the program instructions are executed by a processor, the above method for displaying network identifier information is implemented.

It should be understood that the above general description and the following detailed description are only exemplary and explanatory, and cannot limit the disclosure.

BRIEF DESCRIPTION OF THE DRAWINGS

The drawings herein are incorporated into the specification and constitute a portion of the specification and illustrate embodiments in accordance with the disclosure, and the drawings together with the specification are used to explain the principle of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The second network in the disclosure is a network established based on the first network. In the following description, a Non-Stand Alone (NSA) networking mode is taken as an example for description, where the first network is 5G network in the NSA networking mode, and the second network is 4G network in the NSA networking mode. The description does not limit the applicability of the disclosure to be applied to other communication networks other than the independent networking mode.

When a mobile terminal is located in a certain cell and a random access process is not completed, it is determined that the mobile terminal is in an idle state. When the mobile terminal is located in a certain cell and a random access process is completed, it is determined that the mobile terminal is in a connected state.

The random access process is a basic process in a Long Term Evolution (LTE) system, with a main purpose including: (1) establishing uplink synchronization; and (2) establishing a unique Cell-Radio Network Temporary Identifier (C-RNTI), and requesting the network to allocate uplink resources to the mobile terminal. The random access process is not only used for initial access, but also for new cell access during handover, access after radio link failure, resumption of uplink synchronization when there is uplink/downlink data transmission, and UpLink Shared Channel (UL-SCH) resource request.

In the related art, the mobile terminal receives System Information Block Type 2 (SIB2). SIB2 mainly includes three portions: Radio Resource Config Common, UE-Timers and Constants, and frequency information (freqInfo).

Different operators or the same operator has different SIB2 configuration modes for different 4G cells. For example, SIB2 for some 4G cells is configured with an upper layer indication, while for other 4G cells, SIB2 is not configured with an upper layer indication. The function of the upper indicator indication is equivalent to a 5G network environment indicator. When a value of the upper layer indication is TRUE, it means that the current 4G cell supports access to the 5G network. When the value of the upper layer indication is FALSE, it means that the current 4G cell does not support access to the 5G network.

When the mobile terminal is in the idle state, a 4G network icon is displayed when the upper layer indication is not carried in a received SIB2. When the received SIB2 carries the upper layer indication, a 5G network icon is displayed in a case that the value of the upper layer indication carried in the received SIB2 is TRUE, and the 4G network icon is displayed in a case that the value of the upper layer indication carried in the received SIB2 is FALSE.

When the SIB2 corresponding to the 4G cell where the mobile terminal is located does not carry the upper layer indication, the mobile terminal still displays the 4G network icon even if the 4G cell has an ability to support access to the 5G network, which fails to accurately convey information to the user about information that 5G network environment is available currently. When the mobile terminal is in an overlapping region of multiple 4G cells, and when the multiple 4G cells have different configurations about whether the SIB2 carries the upper layer indication, an icon displayed on a display interface of the mobile terminal may frequently switch between the 4G network icon and the 5G network icon, causing the user to worry about network instability, which has a great impact on the user experience.

The embodiments of the disclosure provide a method for displaying network identifier information. This method is applied to a mobile terminal. The mobile terminal may be a terminal with a display screen, such as a mobile phone, a computer and a tablet computer.

Figure 1:
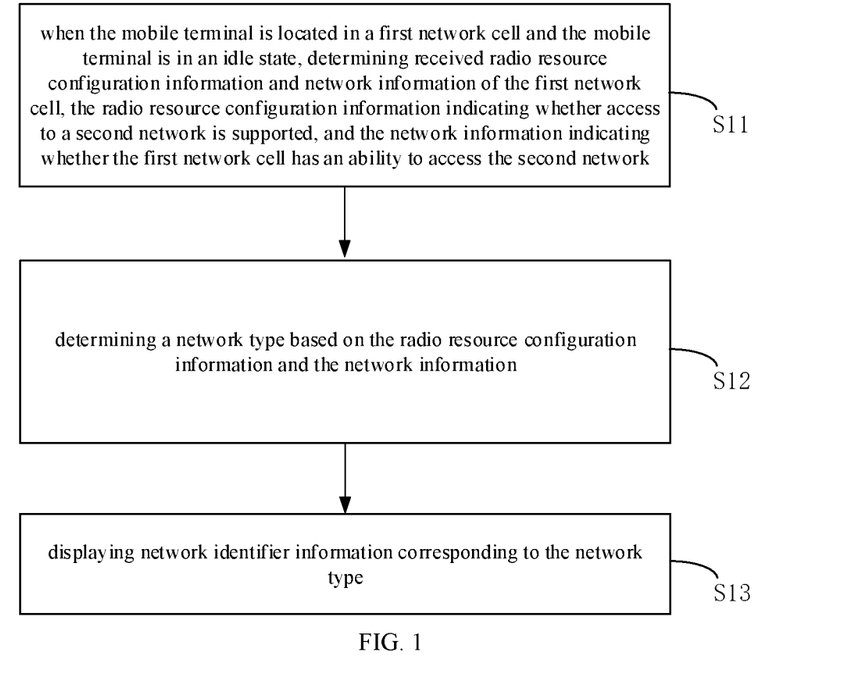
FIG. 1 is a flowchart of a method for displaying network identifier information according to an embodiment of the present disclosure.

FIG. 1 is a flowchart of a method for displaying network identifier information according to an exemplary embodiment. As illustrated in FIG. 1, the method includes the following.

At step S11, when the mobile terminal is located in a first network cell and the mobile terminal is in an idle state, received radio resource configuration information and network information of the first network cell are determined, the radio resource configuration information indicates whether access to a second network is supported, and the network information indicates whether the first network cell has an ability to access the second network.

At step S12, a network type is determined based on the radio resource configuration information and the network information, and the network type includes a first network and the second network.

At step S13, network identifier information corresponding to the network type is displayed.

In an embodiment, the radio resource configuration information may be SIB2. When the SIB2 indicates that access to the second network is supported, SIB2 includes an upper layer indication, and a value of the upper layer indication is TRUE. When SIB2 indicates that access to the second network is not supported, SIB2 includes an upper layer indication and the value of the upper layer indication is FALSE, or SIB2 does not include an upper layer indication.

In an embodiment, network identifier information may be in the form of pictures, text and symbols.

In an embodiment, displaying the network identifier information corresponding to the network type includes: displaying the network identifier information corresponding to the network type in a top status bar of a display interface of the mobile terminal.

In this embodiment, when the mobile terminal is located in the first network cell and is in the idle state, the network type is determined according to the received radio resource configuration information and the network information of the first network cell. The radio resource configuration information is used to indicate whether access to the second network is supported, and the network information is used to indicate whether the first network cell has the ability to access the second network.

By using the characteristics that it may be accurately determined that there is the second network environment in the cell where the mobile terminal is located when it is known that the first network cell supports access to the second network, it can be accurately determined whether a current location of the mobile terminal has the network environment of the second network when the mobile terminal is in an idle state. In the case that the mobile terminal is in an overlapping region of multiple first network cells and the operator has different configuration modes for whether supporting access to the second network is indicated in the radio resource configuration information in the multiple first network cells, it can prevent the network icon of the second network from not being displayed at times when the mobile terminal is in the network environment of the second network, and prevent frequent switching between different network icons on the display interface of the mobile terminal.

The embodiments of the disclosure provide a method for displaying network identifier information. This method is applied to a mobile terminal. The method includes the method illustrated in FIG. 1, and further includes the following.

At step S10, the network information of the first network cell is determined.

In an embodiment, at step S10, determining the network information of the first network cell the mobile terminal is located in includes: obtaining a first network cell set that supports access to the second network from a network-side device, and determining that the network information indicates that the first network cell supports access to the second network when the first network cell where the mobile terminal is located in belongs to the first network cell set. When the first network cell where the mobile terminal is located in does not belong to the first network cell set, it is determined that the first network cell does not support access to the second network. The network-side device may be a base station or a core network device.

The network-side device determining the first network cell set may include following. The network-side device counts the first network cells that support access to the second network, and records a set of identifiers of the first network cells that support access to the second network. A method for the network-side device to count the first network cells that support access to the second network may include: receiving, from respective mobile terminals, the reported identifiers of the first cells that support access to the second network, and generating the set of identifiers of the first network cells that supports access to the second network according to the received identifiers.

For example, the network-side device counts 4G cells that support access to 5G network, and records a set of identifiers of the 4G cells that support access to the 5G network. A method for the network-side device to count the 4G cells that support access to the 5G network may include: receiving the identifiers of the 4G cells that support access to the 5G network reported by respective mobile terminals, and generating the set of the identifiers of the 4G cells that support access to the 5G network based on the received identifiers.

In the embodiments of the disclosure, by obtaining the first network cell set that supports access to the second network from the network-side device, and determining whether the first network cell where the mobile terminal is located in belongs to the first network cell set, it is determined whether the first network cell supports access to the second network. In this way, in view of the accuracy of the first network cell set determined by the network-side device, it may be accurately determined whether the first network cell where the mobile terminal is located in supports access to the second network.

The embodiments of the disclosure provide a method for displaying network identifier information. The method is applied to a mobile terminal. The method includes the method illustrated in FIG. 1, and may also include the following.

At step S11, determining the received radio resource configuration information and network information includes the following.

It is determined that the network type is the second network when the radio resource configuration information indicates that access to the second network is not supported and the network information indicates that the first network cell supports access to the second network.

It is determined that the network type is the first network when the radio resource configuration information indicates that access to the second network is not supported and the network information indicates that the first network cell does not support access to the second network.

When the radio resource configuration information indicates that access to the second network is supported, it is determined that the network type is the second network. That is, it is determined that the network type is the second network when the radio resource configuration information indicates that access to the second network is supported, regardless of whether the network information indicates that the first network cell support access to the second network or not.

For example, when the mobile terminal is located in the 4G cell and is in an idle state, it is determined that the received SIB2 does not contain an upper layer indication, and the 4G cell supports access to the 5G network, and it is determined that the mobile terminal is currently in a NSA 5G network environment, then it is determined that the network type is 5G network.

For example, when the mobile terminal is located in the 4G cell and is in an idle state, it is determined that the received SIB2 does not contain an upper layer indication, and the 4G cell does not support access to the 5G network, it is determined that the mobile terminal is currently in a 4G network environment, then it is determined that the network type is 4G network.

In this embodiment, when the received radio resource configuration information indicates that access to the second network is not supported, but the first network cell supports access to the second network, it is determined that there is condition for accessing the second network currently and there is the network environment of the second network, then it can be determined that the network type is the second network, so that it may be accurately prompted to the user that there is network environment of the second network currently, which prevents frequent switching between different network icons on the display interface of the mobile terminal when the mobile terminal is in an overlapping region of multiple first network cells.

In the related art, after the mobile terminal is switched from the idle state to a connected state, it is considered that the mobile terminal does not use E-UTRA-NR dual connectivity for data transmission before receiving an instruction to add a secondary cell group (SCG), that is, data is not transmitted over both the 4G network and the 5G network, but the 4G network is used for data transmission, thus an 4G icon is displayed. When the mobile terminal displays the 5G icon in the idle state, a switch from the 5G icon to the 4G icon occurs after switching from the idle state to the connected state, and this switch may easily cause the user to have a bad experience of unable to connect to the 5G network.

The embodiments of the disclosure provide a method for displaying network identifier information. This method is applied to a mobile terminal. This method further includes: in response to the network type being the second network when the mobile terminal is in the idle state, maintaining the network type unchanged according to a first maintenance strategy after the idle state is switched to a connected state.

In an embodiment, the method is implemented on the basis of the method illustrated in FIG. 1.

In an embodiment, the first maintenance strategy includes: maintaining the network type unchanged for a first preset time period. The first preset time period is a preset time period, and its specific value may be a modifiable value, such as, 20 seconds, 30 seconds and 1 minute.

For example, when the mobile terminal is in the idle state, it is determined that the network type is the 5G network, and the 5G network identifier is displayed. After the mobile terminal switches from the idle state to the connected state, the network type is maintained unchanged for the preset time period, and the 5G icon is continuously displayed.

In an embodiment, a network type control program is used to determine the network type in this method, and a network identifier display program is used to display the network identifier corresponding to the network type. After the network type control program determines the network type, an indication information is sent to the network identifier display program to notify the network identifier display program to display the icon. The network identifier display program contains a mapping relation between network types and network identifier information. For example, 5G network corresponds to a 5G text icon, and 4G network corresponds to a 4G text icon.

Methods for notifying the network identifier display program to display may include the following.

The first method: after the first maintenance strategy is activated, the network type control program in the mobile terminal continuously sends a display notification to the network identifier display program for the preset time period. This display notification contains a determined network type, so that the network identifier display program displays the network identifier corresponding to the determined network type.

The second method: after the first maintenance strategy is activated, the network type control program in the mobile terminal does not send any information to the network identifier display program within the preset time period, the display of a network identifier corresponding to a prior notification at the last time is maintained during a time period in which the network identifier display program does not receive a notification.

In this embodiment, when the mobile terminal is in the idle state and the 5G network identifier is displayed, the network type remains unchanged according to the first maintenance strategy after the mobile terminal switches from the idle state to the connected state, avoiding a case of switching from the 5G icon displayed on the display interface to the 4G icon caused by switching from the idle state to the connected state, so that the information of the existing 5G network environment may be accurately prompted to the user.

The embodiments of the disclosure provide a method for displaying network identifier information. The method is applied to a mobile terminal. This method further includes: in response to the network type being the second network when the mobile terminal is in the idle state, maintaining the network type unchanged according to a first maintenance strategy after the idle state is switched to a connected state; after maintaining the network type unchanged according to the first maintenance strategy, determining that the network type is the first network in response to determining that an instruction on adding a second network cell is not received in the process of maintaining the network type unchanged according to the first maintenance strategy; and after maintaining the network type unchanged according to the first maintenance strategy, determining that the network type is the second network in response to determining that an instruction on adding the second network cell is received and an instruction on releasing the second network cell is not received.

In an embodiment, the method is implemented on the basis of the method illustrated in FIG. 1.

In the embodiment, after the process of maintaining the network type unchanged according to the first maintenance strategy is completed, in response to determining that the instruction on adding the second network cell is not received during the process of maintaining the network type unchanged according to the first maintenance strategy, it is considered that the mobile terminal uses the first network for data transmission, the network type is determined to be the first network, and the first network icon is displayed.

For example, a time period is set to 20 seconds. When the mobile terminal is in the idle state, it is determined that the network type is 5G, and the 5G network identifier is displayed. After the mobile terminal switches from the idle state to the connected state, the mobile terminal maintains the network type unchanged and continues to display the 5G icon for the next 20 seconds. After the 20 seconds, when it is determined that an instruction on adding the second network cell is not received within this 20 seconds, it is considered that the mobile terminal uses the 4G network for data transmission, the network type is determined to be 4G network, and the 4G icon is displayed.

In this embodiment, based on the condition that the mobile terminal is in the idle state and the 5G network identifier is displayed, after the mobile terminal switches from the idle state to the connected state and the network type is maintained unchanged according to the first maintenance strategy, the network type is determined based on whether the instruction on adding the second network cell is received during the process of maintaining the network type unchanged according to the first maintenance strategy. When the instruction on adding the second network cell is received during maintaining the network type unchanged according to the first maintenance strategy, the network type is determined to be the second network, then display of the network identifier of the second network is maintained in the process of the mobile terminal switching from the idle state to the connected state, which avoids the situation that the 5G icon displayed on the display interface is switched to the 4G icon in the period from the switching from the idle state to the connected state to receiving the instruction on adding the second network cell in the related art. The 5G icon is continuously displayed, to prompt the user about the 5G network environment.

In the related art, when the mobile terminal is in the connected state, after receiving the instruction on adding the SCG cell, it is considered that the mobile terminal uses the E-UTRA-NR dual connectivity to transmit data, that is, data is transmitted over both the 4G network and the 5G network. The network type is determined to be the 5G network type. The 5G icon is displayed. After receiving the instruction of releasing the SCG cell, it is considered that the mobile terminal no longer uses the E-UTRA-NR dual connectivity but uses the 4G network for data transmission, the network type is determined as the 4G network, and the 4G icon is displayed.

Since the operator network dynamically adds the SCG cell or releases the SCG cell according to the network configuration condition and data traffic usage of the mobile terminal, frequently issuing instructions on adding the SCG cell or releasing the SCG cell is easy to occur, which causes frequent switching between the 5G icon and the 4G icon on the display interface of the mobile terminal, and this phenomenon may easily make the user think that the connected 5G network is unstable.

The embodiments of the disclosure provide a method for displaying network identifier information. The method is applied to a mobile terminal. This method includes: in response to a connected state and the network type being the second network, maintaining the network type unchanged according to a second maintenance strategy after receiving an instruction on releasing a second network cell.

In an embodiment, the method is implemented on the basis of the method illustrated in FIG. 1.

In an embodiment, the second maintenance strategy includes: maintaining the network type unchanged for a second preset time period. The second preset time period may be a preset time period, and its specific value may be a modifiable value, such as 20 seconds, 30 seconds and 1 minute.

For example, when the mobile terminal is in the connected state, it is determined that the network type is 5G, and the 5G network identifier is displayed. After receiving the instruction on releasing the SCG cell, the mobile terminal maintains the network type of the second network unchanged for the second preset time period, and continues to display the 5G icon.

In this embodiment, after the mobile terminal receives an instruction on releasing the second network cell under the condition of displaying the second network identifier when the mobile terminal is in the connected state, the network type of the second network maintains unchanged according to the second maintenance strategy, which avoids the problem of frequent icon switching caused by frequently receiving instructions on adding the second network cell and instructions on releasing the second network cell.

The embodiments of the disclosure provide a method for displaying network identifier information. The method is applied to a mobile terminal. This method includes: in response to a connected state and the network type being the second network, and after receiving an instruction on releasing a second network cell, maintaining the network type unchanged according to a second maintenance strategy; after maintaining the network type unchanged according to the second maintenance strategy, determining that the network type is the first network in response to determining that an instruction on adding a second network cell is not received in the process of maintaining the network type unchanged according to the second maintenance strategy; and determining that the network type is the second network in response to determining that an instruction on adding the second network cell is received and an instruction on releasing the second network cell is not received in the process of maintaining the network type unchanged according to the second maintenance strategy.

In an embodiment, the method is implemented on the basis of the method illustrated in FIG. 1.

In an embodiment, the second maintenance strategy includes: maintaining the network type unchanged for a second preset time period. The second preset time period may be a preset time period, and its specific value may be a modifiable value, such as 20 seconds, 30 seconds, and 1 minute.

In an embodiment, after the process of maintaining the network type unchanged according to the second maintenance strategy ends, when it is determined that the instruction on adding a second network cell is not received in the process of maintaining the network type unchanged according to the second maintenance strategy, it is considered that mobile terminal uses the first network for data transmission in this process, so that it is determined that the network type is the first network after the process of maintaining the network type unchanged according to the second maintenance strategy, and the first network icon is displayed.

For example, the time period is set as 30 seconds. When the mobile terminal is in the connected state, it is determined that the network type is 5G, and the 5G network identifier is displayed. After receiving the instruction on releasing the SCG cell, the mobile terminal maintains the network type unchanged and continues to display the 5G icon for the subsequent 30 seconds. After the 30 seconds, when it is determined that an instruction on adding a second network cell is not received within this 30 seconds, it is considered that the mobile terminal uses the 4G network for data transmission, the network type is determined to be 4G network, and the 4G icon is displayed.

In this embodiment, when the mobile terminal is in the connected state, the network type is determined based on whether the instruction on adding the second network cell is received in the process of maintaining the network type unchanged according to the second maintenance strategy. When the instruction on adding the second network cell is received while maintaining the network type unchanged according to the second maintenance strategy, it is determined that the network type is the second network. In this way, display of the network identifier of the second network is maintained when the mobile terminal frequently receives the instruction on adding the second network cell and the instruction on releasing the second network cell, which avoids the situation that in the related art, the 5G icon is frequently switched to the 4G icon on the display interface when the mobile terminal is in the connected state.

Figure 2:
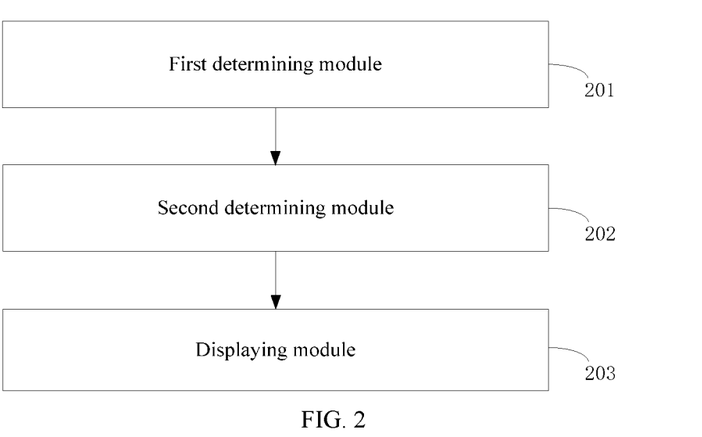
FIG. 2 is a structural diagram of an apparatus for displaying network identifier information according to an embodiment of the present disclosure.

Embodiments of the disclosure provide an apparatus for displaying network identifier information. This apparatus is used in the mobile terminal. FIG. 2 is a structural diagram of an apparatus for displaying network identifier information according to an exemplary embodiment. As illustrated in FIG. 2, this apparatus includes: a first determining module 201, a second determining module 202 and a displaying module 203.

The first determining module 201 is configured to, when the mobile terminal is located in a first network cell and the mobile terminal is in an idle state, determine received radio resource configuration information and network information of the first network cell, the radio resource configuration information indicating whether access to a second network is supported, and the network information indicating whether the first network cell has an ability to access the second network.

The second determining module 202 is configured to determine a network type based on the radio resource configuration information and the network information, and the network type includes a first network and the second network.

The displaying module 203 is configured to display network identifier information corresponding to the network type.

Embodiments of the disclosure provide an apparatus for displaying network identifier information. This apparatus is used in a mobile terminal. This apparatus includes the modules illustrated in FIG. 2.

The second determining module 202 is configured to determine the network type based on the radio resource configuration information and the network information by: determining that the network type is the second network when the radio resource configuration information indicates that access to the second network is not supported and the network information indicates that the first network cell supports access to the second network.

Embodiments of the disclosure provide an apparatus for displaying network identifier information. This apparatus is applied to a mobile terminal. This apparatus includes the modules illustrated in FIG. 2.

The apparatus further includes: a third determining module, configured to determine that the first network cell supports access to the second network.

In an embodiment, the third determining module is configured to determine that the first network cell supports access to the second network by: obtaining a first network cell set that supports access to the second network from the network-side device, and determining that the network information indicates that the first network cell supports access to the second network when the first network cell where the mobile terminal is located belongs to the first network cell set.

Embodiments of the disclosure provide an apparatus for displaying network identifier information. This apparatus is applied to a mobile terminal. This apparatus includes the modules illustrated in FIG. 2, and further includes: a first processing module.

The first processing module is configured to, in response to the network type being the second network when the mobile terminal is in the idle state, maintain the network type unchanged according to a first maintenance strategy after the idle state is switched to a connected state.

In an embodiment, the first processing module is configured to: after the network type is maintained unchanged according to the first maintenance strategy, determine that the network type is the first network in response to determining that an instruction on adding a second network cell is not received in the process of maintaining the network type unchanged according to the first maintenance strategy; and determine that the network type is the second network in response to determining that an instruction on adding a second network cell is received and an instruction on releasing the second network cell is not received in the process of maintaining the network type unchanged according to the first maintenance strategy.

Embodiments of the disclosure provide an apparatus for displaying network identifier information. This apparatus is applied to a mobile terminal. This apparatus includes the modules illustrated in FIG. 2, and further includes: a second processing module.

The second processing module is configured to, in response to a connected state and the network type being the second network, maintain the network type unchanged according to the second maintenance strategy after receiving an instruction on releasing the second network cell.

In an embodiment, the second processing module is further configured to, after maintaining the network type unchanged according to the second maintenance strategy, determine that the network type is the first network in response to determining that an instruction on adding the second network cell is not received in the process of maintaining the network type unchanged according to the second maintenance strategy; and determine that the network type is the second network in response to determining that an instruction on adding the second network cell is received and the instruction on releasing the second network cell is not received in the process of maintaining the network type unchanged according to the second maintenance strategy.

Embodiments of the disclosure provide a mobile terminal. The mobile terminal includes: a processor and a memory configured to store instructions executable by the processor. The processor is configured to execute the executable instructions in the memory to implement the method for displaying network identifier information according to any of the above embodiments.

The embodiments of the disclosure provide a non-transitory computer-readable storage medium having executable instructions stored thereon, and when the executable instructions are executed by a processor, the method according to any of the above embodiments for displaying network identifier information is implemented.

Figure 3:
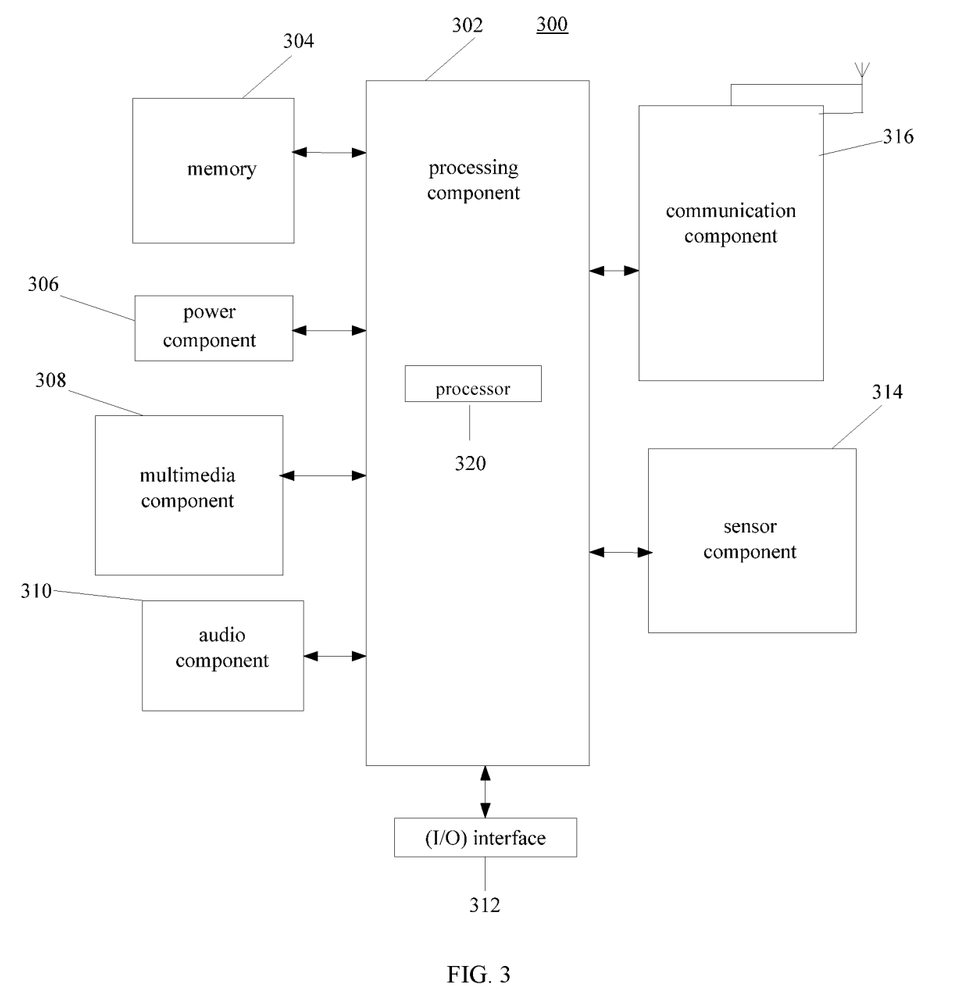
FIG. 3 is a structural diagram of another apparatus for displaying network identifier information according to an embodiment of the present disclosure.

FIG. 3 is a block diagram of an apparatus 300 for displaying network identifier information according to an exemplary embodiment of the disclosure. For example, the apparatus 300 may be a mobile phone, a computer, a digital broadcasting terminal, a message transceiver device, a game console, a tablet device, a medical device, a fitness device and a personal digital assistant.

As illustrated in FIG. 3, the apparatus 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the apparatus 300, such as the operations associated with display, telephone calls, data communications, camera operations, and recording operations. The processing component 302 may include one or more processors 320 to execute instructions to perform all or part of the steps in the above described method. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the apparatus 300. Examples of such data include instructions for any applications or methods operated on the apparatus 300, contact data, phonebook data, messages, pictures, video, etc. The memory 304 may be implemented using any type of volatile or non-volatile memory devices, or a combination of volatile and non-volatile memory devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the apparatus 300. The power component 306 may include a power management system, one or more power sources, and any other components associated with the generation, management, and distribution of power in the apparatus 300.

The multimedia component 308 includes a screen providing an output interface between the apparatus 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front-facing camera and/or a rear-facing camera. When the apparatus 300 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 310 is configured to output and/or input audio signals. For example, the audio component 310 includes a microphone (MIC) configured to receive an external audio signal when the apparatus 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the apparatus 300. For instance, the sensor component 314 may detect an open/closed status of the apparatus 300, relative positioning of components, e.g., the display and the keypad, of the apparatus 300, a change in position of the apparatus 300 or a component of the apparatus 300, a presence or absence of user contact with the apparatus 300, an orientation or an acceleration/deceleration of the apparatus 300, and a change in temperature of the apparatus 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the apparatus 300 and other devices. The apparatus 300 can access a radio network based on a communication standard, such as WiFi, 2G, 3G, 4G or 5G, or a combination thereof. In an exemplary embodiment, the communication component 316 receives a broadcast signal or broadcast associated information from an external broadcast management system via a broadcast channel. In an exemplary embodiment, the communication component 316 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 304, executable by the processor 320 in the apparatus 300, for performing the above method. For example, the non-transitory computer-readable storage medium may be a ROM, a RAM, a CD-ROM, a magnetic tape, a floppy disc, an optical data storage device, and the like.

Regarding the apparatus in the above embodiments, the specific manner in which each module performs operation has been described in detail in the embodiments of the method, and detailed description is not given here.

Those skilled in the art easily think of other embodiments of the disclosure after considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are disclosed by the claims.

It should be understood that the disclosure is not limited to the precise structure that has been described above and shown in the drawings, and various modifications and changes can be made without departing from the scope thereof. The scope of the disclosure is limited only by the appended claims.

What is claimed is:

1. A method for displaying network identifier information, applied to a mobile terminal, comprising:
    when the mobile terminal is located in a first network cell and the mobile terminal is in an idle state, determining received radio resource configuration information and network information of the first network cell, the radio resource configuration information indicating whether access to a second network is supported, and the network information indicating whether the first network cell has an ability to access the second network;
    determining a network type based on the radio resource configuration information and the network information, the network type comprising a first network and the second network; and
    displaying network identifier information corresponding to the network type;
    wherein determining the network type based on the radio resource configuration information and the network information comprises:
    determining that the network type is the second network when the radio resource configuration information indicates that access to the second network is not supported and the network information indicates that the first network cell supports access to the second network.

2. The method of claim 1, comprising:
    obtaining a first network cell set that supports access to the second network from a network-side device, and determining that the network information indicates that the first network cell supports access to the second network when the first network cell where the mobile terminal is located belongs to the first network cell set.

3. The method of claim 1, comprising:
    in response to the network type being the second network when the mobile terminal is in the idle state, maintaining the network type unchanged according to a first maintenance strategy after the idle state is switched to a connected state.

4. The method of claim 3, comprising:
    after maintaining the network type unchanged according to the first maintenance strategy, determining that the network type is the first network in response to determining that an instruction on adding a second network cell is not received in the process of maintaining the network type unchanged according to the first maintenance strategy.

5. The method of claim 1, comprising:
    in response to a connected state and the network type being the second network, maintaining the network type unchanged according to a second maintenance strategy after receiving an instruction on releasing a second network cell.

6. The method of claim 5, comprising:
    after maintaining the network type unchanged according to the second maintenance strategy, determining that the network type is the first network in response to determining that an instruction on adding the second network cell is not received in the process of maintaining the network type unchanged according to the second maintenance strategy.

7. A mobile terminal, comprising:
    a processor;
    a memory configured to store instructions executable by the processor; wherein,
    the processor is configured to execute the instructions in the memory to implement a method for displaying network identifier information, the method comprising:
    when the mobile terminal is located in a first network cell and the mobile terminal is in an idle state, determining received radio resource configuration information and network information of the first network cell, the radio resource configuration information indicating whether access to a second network is supported, and the network information indicating whether the first network cell has an ability to access the second network;
    determining a network type based on the radio resource configuration information and the network information, the network type comprising a first network and the second network; and
    displaying network identifier information corresponding to the network type;

wherein determining the network type based on the radio resource configuration information and the network information comprises:
    determining that the network type is the second network when the radio resource configuration information indicates that access to the second network is not supported and the network information indicates that the first network cell supports access to the second network.

8. The mobile terminal of claim 7, wherein the method further comprises:
    obtaining a first network cell set that supports access to the second network from a network-side device, and determining that the network information indicates that the first network cell supports access to the second network when the first network cell where the mobile terminal is located in belongs to the first network cell set.

9. The mobile terminal of claim 7, wherein the method further comprises:
    in response to the network type being the second network when the mobile terminal is in the idle state, maintaining the network type unchanged according to a first maintenance strategy after the idle state is switched to a connected state.

10. The mobile terminal of claim 9, wherein the method further comprises:
    after maintaining the network type unchanged according to the first maintenance strategy, determining that the network type is the first network in response to determining that an instruction on adding a second network cell is not received in the process of maintaining the network type unchanged according to the first maintenance strategy.

11. The mobile terminal of claim 7, wherein the method further comprises:
    in response to a connected state and the network type being the second network, maintaining the network type unchanged according to a second maintenance strategy after receiving an instruction on releasing a second network cell.

12. The mobile terminal of claim 11, wherein the method further comprises:
    after maintaining the network type unchanged according to the second maintenance strategy, determining that the network type is the first network in response to determining that an instruction on adding the second network cell is not received in the process of maintaining the network type unchanged according to the second maintenance strategy.

13. A non-transitory computer-readable storage medium having executable instructions stored thereon, wherein when the executable instructions are executed by a processor, a method for displaying network identifier information is implemented, the method comprising:
    when the mobile terminal is located in a first network cell and the mobile terminal is in an idle state, determining received radio resource configuration information and network information of the first network cell, the radio resource configuration information indicating whether access to a second network is supported, and the network information indicating whether the first network cell has an ability to access the second network;
    determining a network type based on the radio resource configuration information and the network information, the network type comprising a first network and the second network; and
    displaying network identifier information corresponding to the network type;
    wherein determining the network type based on the radio resource configuration information and the network information comprises:
    determining that the network type is the second network when the radio resource configuration information indicates that access to the second network is not supported and the network information indicates that the first network cell supports access to the second network.

14. The storage medium of claim 13, wherein the method further comprises:
    obtaining a first network cell set that supports access to the second network from a network-side device, and determining that the network information indicates that the first network cell supports access to the second network when the first network cell where the mobile terminal is located belongs to the first network cell set.

15. The storage medium of claim 13, wherein the method further comprises:
    in response to the network type being the second network when the mobile terminal is in the idle state, maintaining the network type unchanged according to a first maintenance strategy after the idle state is switched to a connected state.

16. The storage medium of claim 15, wherein the method further comprises:
    after maintaining the network type unchanged according to the first maintenance strategy, determining that the network type is the first network in response to determining that an instruction on adding a second network cell is not received in the process of maintaining the network type unchanged according to the first maintenance strategy.

17. The storage medium of claim 13, wherein the method further comprises:
    in response to a connected state and the network type being the second network, maintaining the network type unchanged according to a second maintenance strategy after receiving an instruction on releasing a second network cell.

* * * * *